(12) United States Patent
Liu et al.

(10) Patent No.: US 11,070,979 B2
(45) Date of Patent: Jul. 20, 2021

(54) CONSTRUCTING A SCALABLE STORAGE DEVICE, AND SCALED STORAGE DEVICE

(71) Applicant: EMC Corporation, Hopkinton, MA (US)

(72) Inventors: Hui Liu, Westborough, MA (US); Yu Cao, Beijing (CN); Vivian Wenwen Gao, Beijing (CN); Xiaoyan Guo, Beijing (CN); Jieming Di, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/096,683

(22) Filed: Apr. 12, 2016

(65) Prior Publication Data
US 2016/0306550 A1    Oct. 20, 2016

(30) Foreign Application Priority Data

Apr. 15, 2015    (CN) .......................... 201510178760.6

(51) Int. Cl.
*G06F 16/245*    (2019.01)
*G06F 16/22*    (2019.01)
(Continued)

(52) U.S. Cl.
CPC ............ *H04W 12/08* (2013.01); *G06F 3/061* (2013.01); *G06F 3/067* (2013.01); *G06F 3/0623* (2013.01); *G06F 3/0629* (2013.01); *G06F 3/0637* (2013.01); *G06F 3/0683* (2013.01); *G06F 13/16* (2013.01); *G06F 13/4068* (2013.01); *G06F 16/2255* (2019.01);

*G06F 16/245* (2019.01); *G06F 21/6272* (2013.01); *G06F 2221/2111* (2013.01); *G06F 2221/2143* (2013.01)

(58) Field of Classification Search
CPC ............................... G06F 3/061; G06F 3/0683
See application file for complete search history.

(56) References Cited

U.S. PATENT DOCUMENTS 6,393,466 B1 * 5/2002 Hickman .......... G06F 17/30067
707/999.1
7,100,089 B1 * 8/2006 Phelps .................. G06F 3/0607
711/162

(Continued)

FOREIGN PATENT DOCUMENTS

| CN | 1955913 A | 5/2007 |
|---|---|---|
| CN | 101540685 A | 9/2009 |
| CN | 102880430 A | 1/2013 |

*Primary Examiner* — Yaima Rigol
*Assistant Examiner* — Alexander J Yoon
(74) *Attorney, Agent, or Firm* — BainwoodHuang

(57) ABSTRACT

Embodiments of the present disclosure relate to a method an apparatus and a computer program product for constructing a scalable storage device by constructing the scalable storage device by combining a plurality of modularized building blocks; wherein each modularized building block in the plurality of modularized building blocks comprises a magnetic disk enclosure; and at least one modularized building block in the plurality of modularized building blocks comprises a storage processor, the storage processor comprising an input output processing unit; forming a cluster using the input output processing unit in the at least one modularized building block; and processing, using the cluster, an input or output (I/O) request from a host and metadata service.

19 Claims, 6 Drawing Sheets

(51) Int. Cl.
*G06F 21/62* (2013.01)
*G06F 3/06* (2006.01)
*G06F 13/16* (2006.01)
*G06F 13/40* (2006.01)
*H04W 12/08* (2021.01)

(56) References Cited

U.S. PATENT DOCUMENTS

| | | | | |
|---|---|---|---|---|
| 7,574,630 B1 * | 8/2009 | Ranaweera | | G06F 11/2092 714/43 |
| 7,984,043 B1 * | 7/2011 | Waas | | G06F 17/30932 707/718 |
| 8,683,260 B1 * | 3/2014 | Zhang | | G06F 3/0689 714/13 |
| 8,745,095 B2 * | 6/2014 | Bestler | | G06F 16/1752 707/802 |
| 8,751,533 B1 * | 6/2014 | Dhavale | | G06F 3/0647 707/782 |
| 9,069,784 B2 * | 6/2015 | Hartman | | G06F 17/30091 |
| 2002/0191311 A1 * | 12/2002 | Ulrich | | G06F 17/30067 360/1 |
| 2003/0154340 A1 | 8/2003 | Bolt et al. | | |
| 2004/0010660 A1 * | 1/2004 | Konshak | | G06F 3/0614 711/114 |
| 2004/0061486 A1 * | 4/2004 | Peeke | | G06F 11/006 324/66 |
| 2005/0144173 A1 * | 6/2005 | Yamamoto | | G06F 3/0613 |
| 2010/0153481 A1 * | 6/2010 | Ginkel | | G06F 15/16 709/201 |
| 2012/0226672 A1 * | 9/2012 | Hayashi | | G06F 3/0641 707/698 |
| 2014/0176947 A1 * | 6/2014 | Hesketh | | G06K 19/06037 356/402 |
| 2014/0207850 A1 * | 7/2014 | Bestler | | H04L 67/1097 709/203 |
| 2015/0006846 A1 * | 1/2015 | Youngworth | | G06F 3/0689 711/216 |
| 2015/0254088 A1 * | 9/2015 | Chou | | G06F 9/45541 709/212 |

* cited by examiner

CONSTRUCTING A SCALABLE STORAGE DEVICE, AND SCALED STORAGE DEVICE

RELATED APPLICATION

This application claim priority from Chinese Patent Application Number CN2015101843409, filed on Apr. 17, 2015 at the State Intellectual Property Office, China, titled "METHOD AND APPARATUS FOR CONSTRUCTING A SCALABLE STORAGE DEVICE, AND SCALED STORAGE DEVICE," the contents of which is herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present disclosure relate to storage technology.

BACKGROUND OF THE INVENTION

Usually, a traditional storage device (e.g., a storage array) may be constructed in a relatively limited scalability, and may be thus usually designed for predefined optimal use scenarios. Typically, such construction method lack flexibility. For example, different designs may be required for different use scenarios, such that a user may have to purchase different products for different use scenarios. This may be adverse for a user to reuse existing storage resources and also increases a user's cost. For a manufacturer, use scope of its product may be limited by constructing a specific storage product for a specific use scenario, which may increase its research and development costs. In addition, most traditional storage devices may be designed based on specific hardware, which further limits the flexibility of constructing a storage product.

SUMMARY OF THE INVENTION

In order to solve at least some of the problems mentioned above, embodiments of the present disclosure introduce a method and an apparatus for constructing a highly scalable storage system based on modularized building blocks, and provide a new IO processing flow to implement a scaled, non-centralized, and high-performance system.

BRIEF DESCRIPTION OF THE DRAWINGS

Now, some embodiments of the method and/or apparatus according to the embodiments of the present disclosure are described only through examples with reference to the accompanying drawings; in the accompanying drawings.

DETAILED DESCRIPTION

Figure 1:
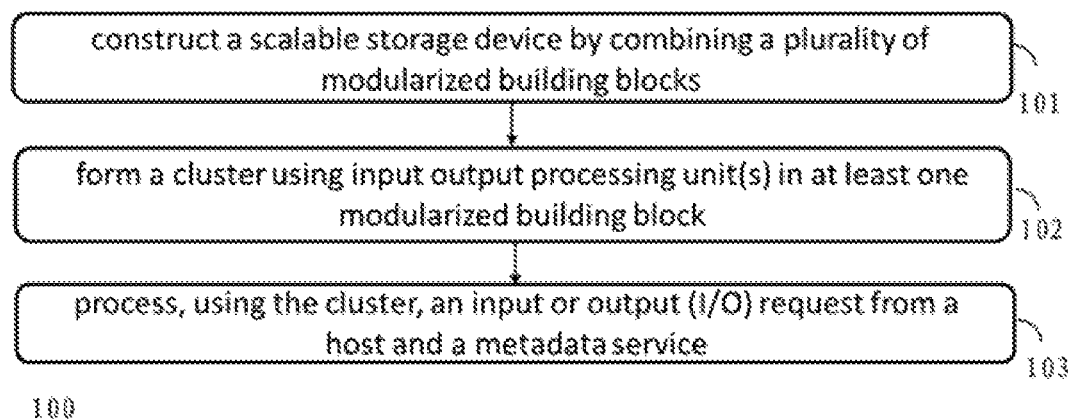
FIG. 1 schematically illustrates a flow diagram of a method for constructing a scalable storage device according to exemplary embodiments of the present disclosure.

Hereinafter, respective exemplary embodiments will be described with reference to the accompanying drawings. It should be understood that these exemplary embodiments are provided only for enabling those skilled in the art to better understand and further implement the present disclosure, not intended to limit the scope of the present disclosure in any manner.

Herein, recitations such as "one embodiment," "further embodiment," or "a preferred embodiment" and the like indicate that the embodiment as described may comprise specific features, structures or characteristics, but each embodiment does not necessarily include such specific features, structures or characteristics. Moreover, these terms do not necessary refer to the same embodiment. It should be further understood that various terms used herein are only used to describe an objective of a specific example, not intended to limit the present disclosure. For example, the singular form "a" and "the" used herein may comprise a plural form, unless otherwise explicitly indicated in the context. It should also be understood that the terms "include," "have" and "comprise" used herein indicate existence of the features, units and/or components, but do not exclude existence of one or more other features, units, components and/or their combination. For example, the term "multiple" used here may indicate "two or more." The term "and/or" as used herein may comprise any and all combinations of one or more of various items listed in association. Definitions of other terms will be provided specifically hereinafter.

In addition, some functions or structures known to those skilled in the art will be omitted in case they obscure embodiments of the disclosure in unnecessary details.

Embodiments of the present disclosure may include a method, a computer program product and apparatus for constructing a scalable storage device so as to improve flexibility of constructing a storage device and enhance performance of a storage device. In order to solve at least some of the problems mentioned above, embodiments of the present disclosure may include a method, a computer program product and an apparatus for constructing a highly scalable storage system based on modularized building blocks, and may provide a new IO processing flow to implement a scaled, non-centralized, and high-performance system.

In one embodiment a method of constructing a scalable storage device may include constructing a scalable storage device by combining a plurality of modularized building blocks. In a further embodiment each modularized building block in a plurality of modularized building blocks may include a magnetic disk enclosure. In a further embodiment at least one modularized building block in a plurality of modularized building blocks may include a storage processor. In a further embodiment a storage processor may include an input output processing unit. A further embodiment may include forming a cluster using an input output processing unit in at least one modularized building block. A further embodiment may include processing, using a cluster, an input or output (I/O) request from a host and a metadata service.

In one embodiment, only a first modularized building block in a plurality of modularized building blocks may include the storage processor. In a further embodiment constructing a scalable storage device by combining a plurality of modularized building blocks may include constructing a scalable storage device by connecting a first modularized building block to each of other modularized building blocks in a plurality of modularized building blocks. In another embodiment, each modularized building block in a plurality of modularized building blocks may include a storage processor. In a further embodiment constructing a scalable storage device by combining a plurality of modularized building blocks may include constructing a scalable storage device by interconnecting each modularized building block in a plurality of modularized building blocks.

In a further embodiment, a plurality of modularized building blocks may include a first group of modularized building blocks and a second group of modularized building blocks. In a further embodiment only a first group of modularized building blocks may include a storage processor. In a further embodiment constructing a scalable storage device by combining a plurality of modularized building blocks may include constructing a scalable storage device by interconnecting each modularized building block in a first group of modularized building blocks and by connecting each modularized building block in the first group of modularized building blocks with one or more modularized building blocks in a second group of modularized building blocks.

In one embodiment, forming a cluster using the input output processing unit in the at least one modularized building block may include selecting one input output processing unit in the cluster as head of the cluster. In a further embodiment a head of a cluster may serve a metadata updating request. In a further embodiment each input output processing unit in a cluster may have a capability of providing a metadata service and data service.

In another embodiment, forming a cluster using an input output processing unit in at least one modularized building block may include selecting another input output processing unit in a cluster as new head of a cluster when a head of the cluster fails. In a still further embodiment, processing, using a cluster, an input or output (I/O) request from a host and a metadata service may include when one input output processing unit is started, notifying other input output processing units of a local magnetic disk being attached to an input output processing unit through a metadata service. In a further embodiment, processing, using a cluster, an input or output (I/O) request from a host and a metadata service may include determining a storage location for data according to a consistent Hash algorithm, such that the data may be evenly distributed across all storage processors.

In one embodiment, determining a storage location for data according to a consistent Hash algorithm may include calculating a Hash value based on a volume identifier and an offset value in an input or output (I/O) request. A further embodiment may include determining a list of hard disk drivers corresponding to a Hash value. A further embodiment may include querying a metadata service to determine input output processing units directly attached to hard disk drivers in a list, and obtain an input output load condition of each input output processing unit in a determined input output processing unit. A further embodiment may include selecting, based on a result of a querying, an input output processing unit for processing an I/O request from among a determined input output processing unit directly attached to hard disk drivers in a list.

In a further embodiment, a number of hard disk drivers included in a list may be more than 1 (One), and the number can be defined by a terminal user. In a still further embodiment, processing, using a cluster, an input or output (I/O) request from a host and a metadata service may include sending an I/O request to selected input output processing unit for processing the I/O request.

In one embodiment an apparatus of constructing a scalable storage device, may include a combining unit that may be configured to construct a scalable storage device by combining a plurality of modularized building blocks. In a further embodiment each modularized building block in a plurality of modularized building blocks may include a magnetic disk enclosure. In a further embodiment at least one modularized building block in a plurality of modularized building blocks may include a storage processor. In a further embodiment a storage processor may include an input output processing unit. In a further embodiment a cluster forming unit may be configured to form a cluster using an input output processing unit in at least one modularized building block. In a further embodiment a cluster processing unit may be configured to process, using a cluster, an input or output (I/O) request from a host and a metadata service.

In one embodiment, only a first modularized building block in a plurality of modularized building blocks may include a storage processor. In a further embodiment a combining unit may be configured to construct a scalable storage device by connecting a first modularized building block to each of other modularized building blocks in a plurality of modularized building blocks. In another embodiment, each modularized building block in a plurality of modularized building blocks may include a storage processor. In a further embodiment a combining unit may be configured to construct a scalable storage device by interconnecting each modularized building block in a plurality of modularized building blocks.

In a further embodiment, a plurality of modularized building blocks may include a first group of modularized building blocks and a second group of modularized building blocks. In a further embodiment only a first group of modularized building blocks may include a storage processor. In a further embodiment a combining unit may be configured to construct a scalable storage device by interconnecting each modularized building block in a first group of modularized building blocks and by connecting each modularized building block in a first group of modularized building blocks with one or more modularized building blocks in a second group of modularized building blocks.

In one embodiment, a cluster forming unit may be configured to select one input output processing unit in a cluster as head of the cluster. In a further embodiment a head of a cluster may serve a metadata updating request. In a further embodiment each input output processing unit in a cluster may have a capability of providing a metadata service and data service.

In another embodiment, a cluster forming unit may be configured to select another input output processing unit in a cluster as new head of a cluster when a head of a cluster fails. In one embodiment, a cluster processing unit may be further configured to, when one input output processing unit is started, notify other input output processing units of a local magnetic disk attached to a input output processing unit through a metadata service. In a yet further embodiment, a cluster processing unit may be further configured to determine a storage location for data according to a consistent Hash algorithm, such that data can be evenly distributed across all storage processors.

In a further embodiment, a cluster processing unit may be configured to calculate a Hash value based on a volume identifier and an offset value in an input or output (I/O) request. A further embodiment may include determining a list of hard disk drivers corresponding to a Hash value. A further embodiment may include querying a metadata service so as to determine input output processing units directly attached to hard disk drivers in a list and obtain an input output load condition of each input output processing unit in a determined input output processing units. A further embodiment may include selecting, based on a result of querying, an input output processing unit for processing I/O request from among a determined input output processing units directly attached to hard disk drivers in a list.

In a further embodiment, a number of hard disk drivers included in a list may be more than 1, and a number can be defined by a terminal user. In one embodiment, a cluster processing unit may be further configured to: send I/O request to a selected input output processing unit for processing an I/O request.

In a further embodiment an apparatus for controlling an scalable storage device, may include at least one processor; and at least one memory that may include computer program codes, wherein at least one memory and computer program codes may be configured, with at least one processor, to cause an apparatus to perform any method as disclosed above.

A further embodiment may include a computer program product, wherein the computer program product may be embodied in a computer-readable medium and includes a computer readable program instruction, and when being loaded into an apparatus, the computer-readable program instruction may perform the method disclosed above.

A further embodiment may include a scaled storage device, wherein the device may include an apparatus according disclosed above, and a plurality of modularized building blocks, wherein each modularized building block in a plurality of modularized building blocks may include one or more magnetic disk enclosures; and wherein at least one modularized building block in a plurality of modularized building blocks that may include a storage processor, the storage processing may include an input output processing unit.

At a convenience of illustration, some embodiments hereinafter may use specific modularized building blocks to construct a scalable storage system. However, those skilled in the art can understand that the method and apparatus according to the embodiments of the present disclosure are not limited to specific modularized building blocks, namely, the method and apparatus according to embodiments of the present disclosure have no limitation to the type of the modularized building block hardware, which may be applicable to any hardware.

FIG. 1 schematically illustrates a flow diagram of a method for constructing a scalable storage device according to an exemplary embodiment of the present disclosure. As shown in FIG. 1, at step S101, method includes constructing a scalable storage device by combining a plurality of modularized building blocks; wherein each modularized building block in a plurality of modularized building blocks includes a magnetic disk enclosure; and at least one modularized building block in the plurality of modularized building blocks includes a storage processor, the storage processor including an input output processing unit; at step S102, forming a cluster using an input output processing unit in at least one modularized building block; and at step S103, processing, using a cluster, an input or output (I/O) request from a host and a metadata service.

Method 100 may construct a scalable storage device using modularized building blocks of a variable number according to actual needs, which has an advantage of high flexibility. Here, "modularized building blocks" and "modularized engine" may use interchangeably. In one embodiment, at a hardware level, a modularized building block (modularized engine) may be based on a 2U-chassis, i.e., an apparatus in a 2U chassis acts as a modularized building block. However, as may be understood by those skilled in the art, embodiments of the present disclosure are not limited thereto. In a further embodiment, a modularized building block may be based on any hardware structure, e.g., it may be based on 1U and 4U chassis or based on other structures.

In some embodiments, a modularized building block may be based on a 2U chassis. In some other embodiments, each 2U chassis may be divided into a plurality of individual spaces, e.g., it may be divided into 2, 3 or 4 individual spaces depending on hardware design. In some other embodiments, some spaces may be used for high-density magnetic disk enclosure (DE) having a hard disk driver and an input output (IO) expander. In some other embodiments, one or more spaces may be used for a storage processor (SP). In some other embodiments, a storage processor SP may have a central processing unit (CPU), a memory, and a motherboard; and it may run a full-functional operating system (OS) like Linux; however, as can be understood by those skilled in the art, embodiments of the present disclosure have no limitation to the type of operating system, i.e., it may be any appropriate operating system.

In one embodiment, a software stack may be built on a storage processor (SP). In a further embodiment, an underlying layer of a software stack may be, for example, but not limited to, Linux OS and Linux container. In a further embodiment, a Linux container may provide a portable, light-weighted runtime environment for a core storage stack. In a further embodiment, a Linux container may be used to create at least three or more separate runtime environments. In a further embodiment, a first Linux container therein may be referred to as "a controller," which may provide a management service for an entire storage system. In a further embodiment, a second Linux container and a third Linux container may be referred to as "input output processing units" ("IOPU"), which may manage magnetic disk enclosure and may provide block devices. In a further embodiment, with two or more IOPUs, availability of a storage system may be significantly improved.

In one embodiment, a plurality of modularized software blocks as combined in step S101 may include a plurality of existing modularized building blocks; while generation of a modularized building block may not necessarily be part of method 100. In one embodiment, it may be possible that only a first modularized building block of a plurality of modularized building blocks as combined in step S101 may include a SP; In a further embodiment, moreover, step S101 may include constructing a scalable storage device by connecting a first modularized building block to each of other modularized building blocks in a plurality of modularized building blocks. In one embodiment, a connection may be performed via, e.g., an input output expander; however, embodiments of the present disclosure are not limited thereto; instead, any appropriate alternative connection manner may also be employed. In this embodiment, (one or more) SPs in a first modularized building block form a cluster in step S102 may be used to process an input or output (I/O) request and a metadata service in step S103.

Figure 2A:
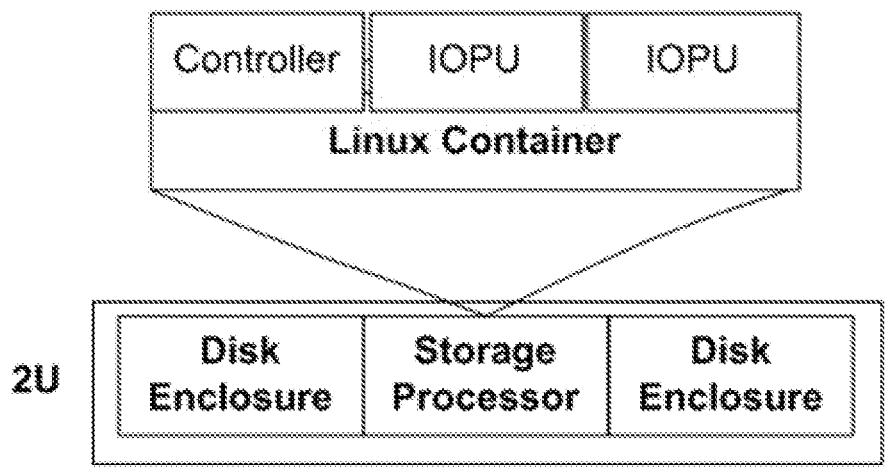
FIGS. 2A-2B illustrate a schematic diagram of modularized building blocks according to exemplary embodiments of the present disclosure.
Figure 2B:
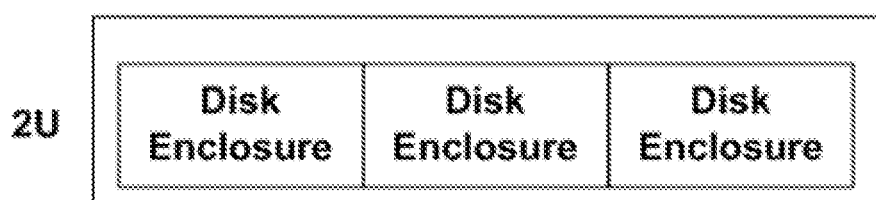

In one embodiment, building blocks similar to a first modularized building block and having an SP may be referred to as a full-functional modularized engine (FFME). In a further embodiment, a FFME may include both of a disk enclosure (DE) and a storage processor (SP). FIG. 2A illustrates an exemplary implementation structure of FFME. In this embodiment, each of the other modularized building blocks than a first modularized building block in a plurality of modularized building blocks only may include a disk enclosure, without including an SP. In a further embodiment, such modularized engine may be referred to as disk driver-only modularized engine (DDME). One exemplary embodiment structure of implementing a DDME is shown in FIG. 2B.

As an example embodiment, rather than limitation, FFME and DDME may be designed based on an open compute project (OCP). In a further embodiment, open computer hardware may be an open hardware platform employing a technology proved to be reliable. In a further embodiment, such a technology may be mature enough and may implement a business storage array thereon. In an example embodiment, at a hardware level, DEs at the left and right in FIG. 2A may be used as a disk enclosure based on OCP project Torpedo. In a specific example embodiment, a DE may have inside an internal SAS expander, fifteen 3.5" drivers arranged in a 3×5 array, and two 80 mm fans. In a further embodiment, a central space in FIG. 2A may be used as a storage controller (i.e., SP). In a further embodiment, a storage controller may be built for example based on an OCP AMD motherboard hardware v2.0. In an example embodiment, it may have two AMD CPUs and a 4-channel double data rate (DDR) storage. In a further embodiment, on a storage controller hardware, an open Linux container "docker" may be used to build a software stack.

Figure 3A:
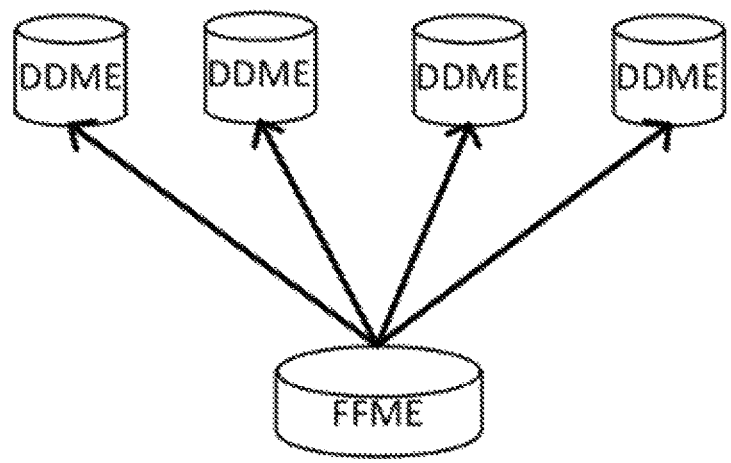
FIGS. 3A-3C schematically illustrate a schematic diagram of a storage device constructed by combining a plurality of modularized building blocks according to exemplary embodiments of the present disclosure.

FIG. 3A shows an exemplary schematic diagram of constructing a scalable storage device by connecting the FFME and the DDME via the input output expander in step S101 in one embodiment. A structure of such constructed storage device is referred to as a "single FFME+multi-DDME" architecture. SP(s) in the FFME forms a cluster, namely, all IO requests are served on the FFME. This system can be adapted to a use scenario that requires a large disk capacity but less IO workload.

In one embodiment, each modularized building block in a plurality of modularized building blocks combined in step S101 may include a storage processor (SP). In a further embodiment, moreover, step S101 may include constructing a scalable storage device by interconnecting each modularized building block in a plurality of modularized building blocks. In one embodiment, an interconnection may be performed for example via an IP network line. However, embodiments of the present disclosure are not limited thereto; instead, they may be performed in any appropriate connection manner. In this embodiment, in step S102, all SPs in a plurality of modularized building blocks form a cluster.

Figure 3B:
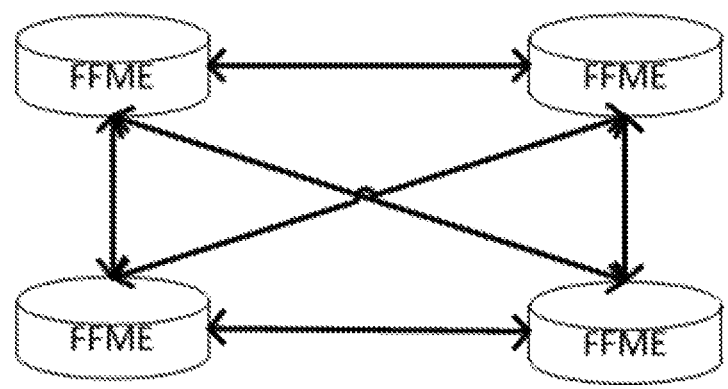

FIG. 3B shows an exemplary schematic diagram of constructing a scalable storage device by interconnecting a plurality of FFMEs via an IP network line in step S101 according to one embodiment. Because respective connected building blocks have the same structure, an architecture of such constructed storage device may be referred to as "symmetrical architecture." All FFMEs therein are connected through a network line, e.g., connected through an IP network switch, and form an active/active cluster, or a dual-active cluster, i.e., each connected side is activated and available. In this example, all SPs in the plurality of FFMEs construct a cluster to process an input or output (I/O) request and a metadata service. Each SP in the cluster can process IO request. In other words, any IO request may be processed on each FFME. Therefore, for use scenario with a high IO load, such an architecture may be significantly useful. For example, each FFME has an SP; then when the IO request, for example, randomly arrives at a certain SP, the SP can determine whether it is capable of processing the IO request based on its own state, e.g., a load condition; in the case of incapability, it may be forwarded to other SP for processing. Because each SP can process any IO, IO processing workload can be processed dispersedly, which enhances the performance of the storage system.

In one embodiment, a plurality of modularized building blocks combined in step S101 may include a first group of modularized building blocks and a second group of modularized building blocks. In a further embodiment, only a first group of modularized building blocks (e.g., FFME) may include a storage processor. In a further embodiment step S101 may include constructing a scalable storage device by interconnecting each modularized building block in a first group of modularized building blocks (e.g., via an IP network line) and connecting each modularized building block in the first group of modularized building blocks with one or more modularized building blocks in a second group of modularized building blocks (e.g., DDME) (e.g., via the input output expander).

Figure 3C:
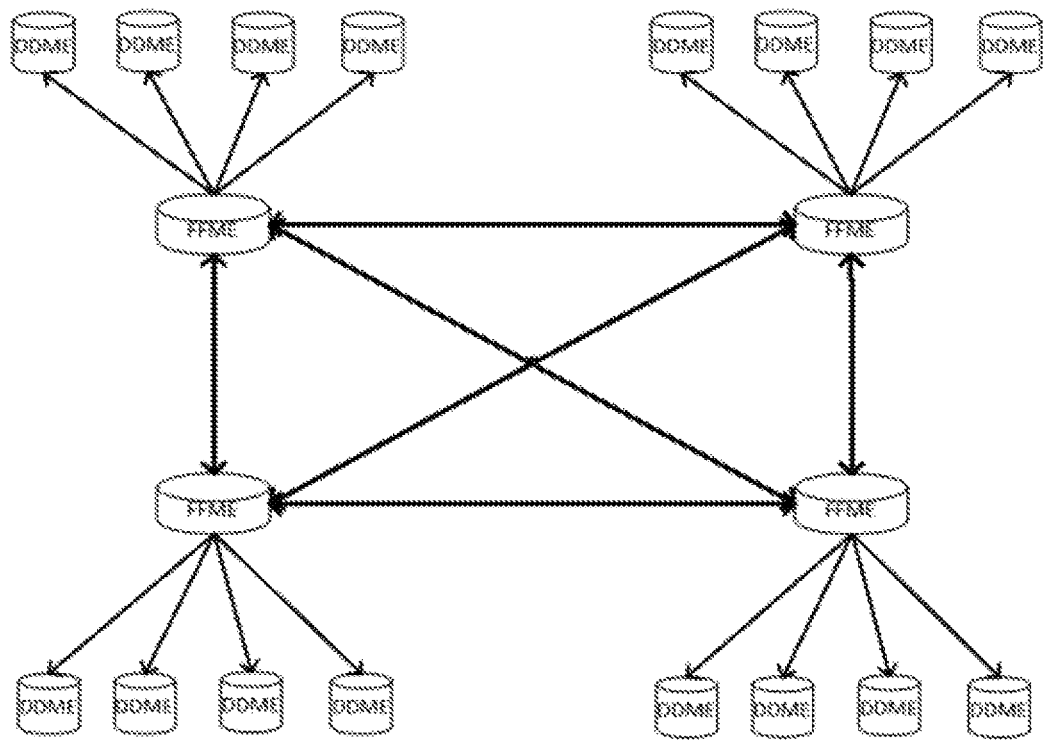

FIG. 3C shows an exemplary schematic diagram according to one embodiment. It may be regarded as an example of constructing a storage device by mixing the embodiments of FIG. 3A and FIG. 3B. The structure of such constructed storage device is referred to as a "mixed structure." It should be noted that though each FFME in FIG. 3C is connected to an identical number of DDMEs, embodiments of the present disclosure are not limited thereto. In some embodiments, each building block in the first group of modularized building blocks may be connected to different numbers of building blocks in the second group of building blocks.

In one embodiment, at step S101, a cluster may be formed by input output processing units (IOPUs) in all SPs in all FFMEs in FIG. 3B or FIG. 3C. In a further embodiment, each FFME may include a single SP for IO processing, and one or more DEs for providing disk capacity. In a further embodiment, each FFME may also include a more complex configuration so as to satisfy a use scenario of a large-scale capacity and performance. In an example embodiment, a FFME may include two or more SPs. In one embodiment, a cluster may be a PAXOS group, i.e., all IOPUs in all SPs form a PAXOS group to process data, metadata, and cluster state management. An exemplary embodiment may use Apache Zookeeper as a non-centralized metadata service for metadata storage, global lock, and cluster state management.

In one embodiment, step S102 may include selecting an input output processing unit in a cluster as a head of the cluster, wherein the head of the cluster may server a metadata update request. In a further embodiment, each input output processing unit in a cluster may have a capability of providing a metadata service and data service. In one embodiment, a metadata service may manage block location mapping for all physical hard disks and logical volumes. In a further embodiment, a data service may process an I/O of physical hard disk drivers of all locally attached drivers.

In another embodiment, step S102 may include selecting another input output processing unit in a cluster as new head of a cluster when the head of the cluster fails. In an exemplary embodiment, it may be determined which IOPU in a cluster is a head based on an PAXOS algorithm. In a further embodiment, after a current head of a cluster fails, election of a new head may be determined.

In a still further embodiment, step S103 may include when an input output processing unit starts, notifying other input output processing units in a cluster of a local disk attached onto the input output processing unit through a metadata service. In an example embodiment upon power-on, an IOPU starts and may be loaded into the storage system. In a further embodiment, an IPOU reports all locally attached drivers to a metadata server; the metadata services may communicate via an PAXOS to exchange information of metadata. In a further embodiment, when a metadata service of an IOPU knows the information of its hard disk driver, the metadata service may notify the metadata service of other IOPUs through the PAXOS, such that the metadata service on each IOPU may know disk information of all IOPUs. In a further embodiment, change of any metadata may be managed by a PAXOS group (i.e., the cluster), and may be synchronized across all IOPUs of SPs.

In one embodiment, step 103 may include determining a storage location for data according to a consistent Hash algorithm, such that data may be evenly distributed across all of a plurality of modularized building blocks. In one example embodiment, all hard disk drivers in a storage system form a consistent Hash ring. In a further embodiment, based on a Hash value, each driver may be responsible for a range of data. In a further embodiment, a consistent hash, for example, may split data based on a volume unique ID and block offset.

In one embodiment, in step S103, determining a storage location for data according to a consistent Hash algorithm may include the following operations:
calculating a Hash value based on a volume identifier and an offset value in an input or output (I/O) request;
determining a list of hard disk drivers corresponding to the Hash value;
querying a metadata service to determine input output processing units directly attached to the hard disk drivers in a list and obtain an input output load condition of each input output processing unit in a determined input output processing units; and
selecting an input output processing unit for processing an I/O request from among the determined input output processing units directly attached to the hard disk drivers in the list.

In one embodiment, the operations mentioned above may be performed in an SP where I/O requests arrive. In one embodiment, a Hash table may be used to record a mapping between a Hash value and a data location. In a further embodiment, a Hash table may be regarded as a metadata, and its storage location may be determined by a PAXOS algorithm. In an example embodiment, it may not only be stored in a PAXOS group head, or in other words, a cluster head, but stored in a distributed way in a plurality of IOPUs.

In another embodiment, a number N of hard disk drivers that may be included in a list of hard disk drivers corresponding to Hash values as determined in step S103, may be greater than 1, and N may be defined by a terminal user. In a further embodiment, each data may be stored on at least two hard disk drivers for error tolerance, while a user may define a number of data copies.

In a further embodiment, selecting an input output processing unit for processing an I/O request based on a result of the querying may include selecting an IOPU with minimum current load. In one example embodiment, a metadata service may maintain health information of all hardware and software components in a storage device, thereby preventing forwarding an I/O request to a failed SP by querying the metadata service, and failover may be effectively performed.

In one embodiment, step S103 may include sending an I/O request to a selected input output processing unit for processing the I/O request. In an example embodiment, if an I/O request is a write request, in step S103, the write request may be sent to a selected IOPU. In a further embodiment, a selected IOPU may then receive a write request and store data into a hard disk. In a further embodiment, success may be returned after completion of a write request. In another example example embodiment, if an I/O request is a read request, in step S103, the read request may be sent to a selected IOPU. In a further embodiment, a selected IOPU may then receive a read request and read data from a hard disk. In a further embodiment, success may be returned after a read request is completed.

A method of constructing a scalable storage device according to embodiments of the present disclosure has been described above with reference to FIG. 1. The advantages of the method at least lies in:

(1) providing a modularized design, such that different combinations of building blocks may be used to form a complex storage system, satisfying different workload requirements;

(2) good scalability; wherein the method allows using a consistent Hash and PAXOS group to eliminate system failure caused by a single failure and eliminate performance hot point, such that a single point burden may not be too demanding;

(3) low cost without hardware lock, wherein the method may have no limit to hardware types and thus may be applicable to any hardware. In an example embodiment, business hardware such as OCP may be used as modularized building blocks for manufacturing a low cost scalable storage system.

Meanwhile, in some embodiments method 100 may effectively process any hardware and software component failure, e.g.:

1) A IOPU metadata service may maintain health information of all hardware and software components, thereby effectively accomplishing failover.

2) Each piece of data may have multiple duplicates, such that failure of one or two hard disk drivers may not affect data usability.

3) IOPU metadata service may replicate data by using PAXOS; therefore, no single-point failure occurs.

4) Use of multiple SPs may be allowed, such that a storage system can tolerate SP failure, e.g., CPU memory/motherboard failure; and 5) each SP may be allowed to have multiple IOPUs and may process software failures of IOPU.

It should be noted that although some exemplary embodiments of the present disclosure have described a method of constructing a scalable storage device with two modularized building blocks as an example, as can be understood by those skilled in the art, the method may likewise be applicable to scaling a storage device using any number of building blocks. In other embodiments that may include actual implementation, scaling may be implemented by combining a variable number of modularized building blocks through referring to any method according to FIGS. 1-3.

Hereinafter, an exemplary apparatus 400 for constructing a scalable storage device according to embodiments of the present disclosure will be described with reference to FIG. 4. The apparatus may implement a method according to any embodiment described with reference to FIG. 1, but not limited to implementing the method 100; while method 100 described with reference to FIG. 1 may be implemented by apparatus 400, but not limited to be implemented by apparatus 400. For example, in some embodiments, at least one step of method 100 may be implemented by other apparatus.

Figure 4:
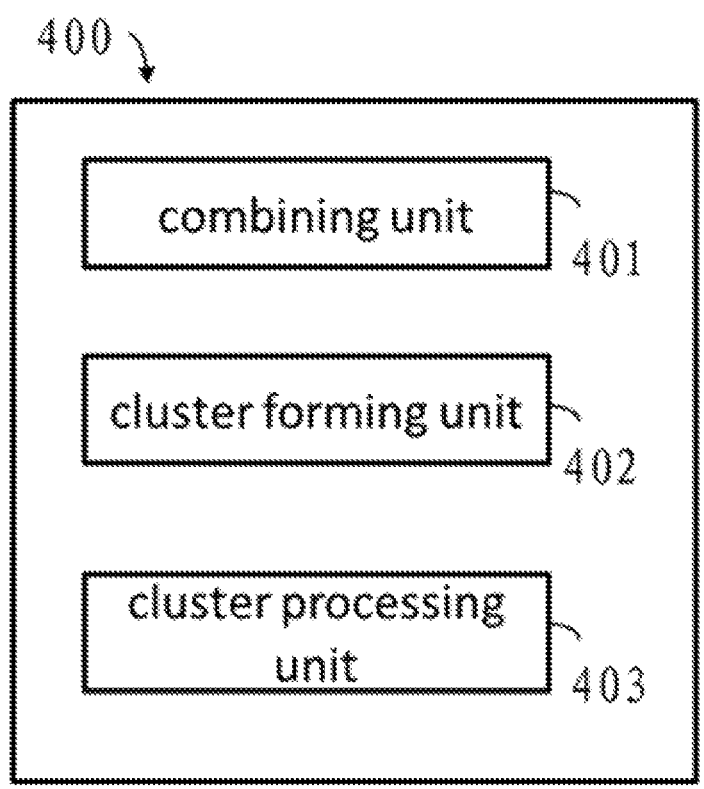
FIG. 4 schematically shows a structural block diagram of an apparatus for constructing a scalable storage device according to exemplary embodiments of the present disclosure.

As shown in FIG. 4, apparatus 400 includes combining unit 401 configured to construct the scalable storage device by combining a plurality of modularized building blocks; wherein each modularized building block in the plurality of modularized building blocks comprises a magnetic disk enclosure; and at least one modularized building block in the plurality of modularized building blocks comprises a storage processor, the storage processor comprising an input output processing unit. Apparatus 400 further includes cluster forming unit 402 configured to form a cluster using an input output processing unit in at least one modularized building block. Apparatus 400 further includes cluster processing unit 403 configured to process, using the cluster, an input or output (I/O) request from a host and a metadata service.

According to one embodiment, combining unit 401, cluster forming unit 402, and cluster processing unit 403 can be configured to implement the operations of steps S101, S102, and S103 as described with reference to FIG. 1. In one embodiment, only a first modularized building block in a plurality of modularized building blocks as combined by combining unit 401 may include a storage processor. In a further embodiment combining unit 401 may be configured to construct the scalable storage device by connecting a first modularized building block to each of other modularized building blocks in a plurality of modularized building blocks. In one embodiment, an interconnection may be performed for example by an input output expander; however, embodiments of the present disclosure are not limited thereto; instead, they may be performed through any appropriate connection manner.

In another embodiment, each modularized building block in a plurality of modularized building blocks as combined by combining unit 401 may include a storage processor. In a further embodiment, combining unit 401 may be configured to construct a scalable storage device by interconnecting each modularized building block in a plurality of modularized building blocks. In one embodiment, an interconnection may be performed for example via an IP network line. Embodiments of the present disclosure are not limited thereto; instead, they may be performed through any appropriate connection manner.

In a further embodiment, a plurality of modularized building blocks combined by combining unit 401 may include a first group of modularized building blocks and a second group of modularized building blocks. In a further embodiment, only a first group of modularized building blocks (e.g., FFME) may include a storage processor, i.e., a second group of modularized building blocks (e.g., DDME) in a plurality of modularized building blocks does not include the storage processor. In a further embodiment, combining unit 401 may be configured to: construct a scalable storage device by interconnecting each modularized building block in a first group of modularized building blocks (e.g., via the IP network line) and by connecting each modularized building block in a first group of modularized building blocks with one or more modularized building blocks in a second group of modularized building blocks (e.g., via the input output expander).

In one embodiment, cluster forming unit 402 may be configured to: select one input output processing unit in a cluster as head of the cluster. In a further embodiment, a head of a cluster may serve a metadata updating request. In a further embodiment, each input output processing unit in a cluster has a capability of providing a metadata service and data service. In another embodiment, cluster forming unit 402 may be configured to select another input output processing unit in a cluster as new head of the cluster when the head (current head) of the cluster fails.

In one embodiment, cluster processing unit 403 may be configured to: when one input output processing unit is started, notify other input output processing units of a local magnetic disk attached to the one input output processing unit through a metadata service. In one embodiment, cluster processing unit 403 may be configured to determine a storage location for data according to a consistent Hash algorithm, such that data may be evenly distributed across all storage processors.

In an exemplary embodiment, cluster processing unit 403 may be configured to perform the following operations:
calculate a Hash value based on a volume identifier and an offset value in an input or output (I/O) request;
determine a list of hard disk drivers corresponding to the Hash value;
query a metadata service so as to determine input output processing units directly attached to the hard disk drivers in a list and obtain an input output load condition of each input output processing unit in the determined input output processing units; and select, based on a result of the querying, an input output processing unit for processing an I/O request from among the determined input output processing units directly attached to the hard disk drivers in the list.
In a further embodiment, N>1 hard disk drivers may be included in a determined list of hard disk drivers corresponding to a Hash value, and number N may be defined by a terminal user.

In one embodiment, cluster processing unit 403 may be configured to: send an I/O request to a selected input output processing unit for processing the I/O request, and the selected IOPU may process the I/O request.

As mentioned above, method 100 and apparatus 400 according to embodiments of the present disclosure construct a scalable storage system using multiple modularized building blocks, which provides a good construction flexibility and may enhance error-tolerance performance of a storage system.

Although in some embodiments, implementation of the method/apparatus as disclosed herein are described with some specific components (e.g., 2U chassis, OCP-based hardware) and a specific algorithm (e.g, PAXOS algorithm) as examples, as can be understood by those skilled in the art, embodiments of the present disclosure are not limited thereto, but may be applied more widely.

Those skilled in the art should understand, any structural diagram depicted here represents an illustrative principle diagram for implementing the principle of the present disclosure. Similarly, it should be understood that the flow diagram depicted here represent various processes that may be specifically embodied in a machine readable medium, and executed by a machine or a processing device, regardless of whether such machine or processing device are explicitly illustrated. In some embodiments, some operations in the flow diagram may also be completed manually.

A person of normal skill in the art should also understand, one or more method steps in the method steps as mentioned in the present disclosure may also be implemented in a single functional block or by a single device, while in some embodiments, a functional block may also implement functions of a plurality of method steps or functional blocks. The steps in the flow diagram may be executed in any appropriate order, not necessarily in accordance with the illustrated order.

Various units included in apparatus 400 according to embodiments of the present disclosure may be implemented in various other manners, including software, hardware, firmware, or any combination thereof. For example, in some embodiments, apparatus 400 may be implemented using software and/or firmware. Alternatively or additionally, apparatus 400 may be implemented partially or fully based on hardware. For example, one or more units in apparatus 400 may be implemented as an integrated circuit (IC) chip, an application-specific integrated circuit (ASIC), a system on chip (SOC), a field programmable gate array (FPGA), etc. The scope of the present disclosure is not limited in this aspect. Additionally, in some embodiments, a single module in apparatus 400 may also be implemented by a plurality of modules; in some other embodiments, the functions of multiple modules in apparatus 400 may also be implemented as a single module. In some embodiments, functions of some units may be manually implemented by the user. In the case of apparatus, the unit may be implemented not through a machine, software, hardware and/or firmware.

The present disclosure may be a system, apparatus, device, method and/or computer program product. According to one embodiment, the present disclosure may be implemented by an apparatus for constructing a scalable storage device, wherein the apparatus comprises at least one processor; and at least one memory including computer program codes. In a further embodiment the at least one memory and the computer program codes are configured to, along with the at least one processor, cause the apparatus to perform any method depicted above with reference to FIG. 1. According to a further embodiment, the present disclosure may be implemented through a computer program product; the computer program product may be embodied in a computer readable medium and includes a computer readable program instruction, and when loaded into an apparatus, the computer readable program instruction performs any method of the embodiments of the present disclosure.

An embodiment of the present disclosure also provides a scaled storage device. In a further embodiment, a device may be constructed according to any method described with reference to FIG. 1, and/or, the apparatus may include any apparatus 400 described with reference to FIG. 4, and a plurality of modularized building blocks, wherein each modularized building block in a plurality of modularized building blocks may include one or more disk enclosure; and wherein at least one modularized building block in a plurality of modularized building blocks may include a storage processor, the storage processor may include an input output processing unit.

The above depictions with reference to the accompanying drawings are only exemplarily provided for illustrating the present disclosure. Those skilled in the art may understand that different structures may be provided based on the principle of the present disclosure described above. Although these different structures are not explicitly described or illustrated here, they all embody the principle of the present disclosure and are included within its spirit and scope. Furthermore, all examples mentioned herein are expressly for pedagogical purpose to help a reader to understand principles of the disclosure, and. should not be construed as limitations to the scope of the disclosure. Besides, all statements as to the principle, aspects, and embodiments of the present disclosure and their specific examples include their equivalents.

What is claimed is:

1. A method of constructing a scalable storage device, the method comprising:
   constructing a scalable storage device by combining a plurality of modularized building blocks; wherein each modularized building block comprises a magnetic disk enclosure; and at least one modularized building block in the plurality of modularized building blocks comprises a storage processor, the storage processor comprising an input output processing unit;
   forming a cluster using the input output processing unit in the at least one modularized building block; and
   processing, using the cluster, at least one of an input or an output (I/O) request from a host and a metadata service,
   wherein processing, using the cluster, the at least one of an input or an output (I/O) request from a host and the metadata service comprises:
   determining a storage location for data according to a consistent Hash algorithm, such that the data is evenly distributed across the plurality of modularized building blocks, the determining including:
      computing a Hash value based on a volume identifier and an offset value the I/O request;
      determining a list of multiple hard disk drivers corresponding to the Hash value;
      querying the metadata service, to determine input output processing units directly attached to the hard disk drivers in the list, and obtain an input output load condition of each input output processing unit in the determined input output processing units; and
      selecting, based on a result of the querying indicating each input output load condition, an input output processing unit for processing the I/O request from among the determined input output processing units directly attached to the hard disk drivers in the list,
   wherein the storage processor comprising the input output processing unit comprises a controller and at least two input output units, the controller realized within a Linux container running on the storage processor, each input output unit realized within a respective Linux container running on the storage processor.

2. The method according to claim 1, wherein only a first modularized building block in the plurality of modularized building blocks comprises the storage processor; and wherein constructing the scalable storage device by combining a plurality of modularized building blocks comprises performing at least one of:
   constructing the scalable storage device by coupling the first modularized building block to each of other modularized building blocks in the plurality of modularized building blocks; OR
   constructing the scalable storage device by interconnecting each modularized building block in the plurality of modularized building blocks.

3. The method according to claim 1, wherein the plurality of modularized building blocks comprise a first group of modularized building blocks and a second group of modularized building blocks, and only the first group of modularized building blocks comprises the storage processor; and wherein constructing the scalable storage device by combining a plurality of modularized building blocks comprises:
constructing the scalable storage device by coupling each modularized building block in the first group of modularized building blocks and by coupling each modularized building block in the first group of modularized building blocks with one or more modularized building blocks in the second group of modularized building blocks.

4. The method according to claim 1, wherein forming the cluster using the input output processing unit in the at least one modularized building block further comprises:
selecting one input output processing unit in the cluster as a head of the cluster; wherein the head of the cluster serves a metadata updating request; and each input output processing unit in the cluster capable of providing the metadata service and a data service.

5. The method according to claim 4, further comprises:
selecting another input output processing unit in the cluster as a new head of the cluster when the head of the cluster fails.

6. The method according to claim 1, wherein a number of the hard disk drivers included in the list is defined by a terminal user.

7. The method according to claim 1, wherein after selecting, based on a result of the querying, the input output processing unit for processing the I/O request, the method further comprises:
sending the I/O request to the selected input output processing unit for processing the I/O request.

8. The method of claim 1, wherein constructing the scalable storage device includes providing modularized building blocks of two types:
a first type that includes a full-functional modularized engine (FFME) having both a disk enclosure and a storage processor, the storage processor having an input output processing unit (IOPU); and
a second type that includes a disk driver-only modularized engine (DDME) having a disk enclosure but no storage processor,
wherein the scalable storage device includes at least one modularized building block of the first type operatively connected within a single chassis to at least one modularized building block of the second type.

9. The method of claim 8, wherein the scalable storage device includes at least two modularized building block of the first type, and wherein the method further comprises, upon receipt of an I/O request by a storage processor of a first modularized building block of the scalable storage device, the storage processor (i) determining that it is incapable of processing the I/O request and, in response to the determination, (ii) forwarding the I/O request to a second storage processor of a second modularized building block of the scalable storage device.

10. An apparatus of constructing a scalable storage device, comprising at least one processor; and at least one memory on which is stored computer program codes, wherein the at least one memory and the computer program codes are, with the at least one processor, configured to:
construct a scalable storage device by combining a plurality of modularized building blocks; wherein each modularized building block comprises a magnetic disk enclosure; and at least one modularized building block in the plurality of modularized building blocks comprises a storage processor, the storage processor comprising an input output processing unit;
form a cluster using the input output processing unit in the at least one modularized building block; and
process, using the cluster, at least one of an input or an output (I/O) request from a host and a metadata service,
wherein the at least one memory and the computer program codes are further configured to determine a storage location for data according to a consistent Hash algorithm, such that the data is evenly distributed across all of the storage processors, the consistent Hash algorithm configured to produce a Hash value computed based on a volume identifier and an offset value the I/O request, and wherein the at least one memory and the computer program codes are further configured to:
determine a list of multiple hard disk drivers corresponding to the Hash value;
query the metadata service, to determine input output processing units directly attached to the hard disk drivers in the list, and obtain an input output load condition of each input output processing unit in the determined input output processing units; and
select, based on a result of the query indicating each input output load condition, an input output processing unit for processing the I/O request from among the determined input output processing units directly attached to the hard disk drivers in the list,
wherein the storage processor comprising the input output processing unit comprises a controller and at least two input output units, the controller realized within a Linux container running on the storage processor, each input output unit realized within a respective Linux container running on the storage processor.

11. The apparatus according to claim 10, wherein only a first modularized building block in the plurality of modularized building blocks comprises the storage processor; and wherein constructing the scalable storage device by combining a plurality of modularized building blocks comprises performing at least one of:
constructing the scalable storage device by coupling the first modularized building block to each of other modularized building blocks in the plurality of modularized building blocks; OR
constructing the scalable storage device by interconnecting each modularized building block in the plurality of modularized building blocks.

12. The apparatus according to claim 10, wherein the plurality of modularized building blocks comprise a first group of modularized building blocks and a second group of modularized building blocks, and only the first group of modularized building blocks comprises the storage processor; and wherein constructing the scalable storage device by combining a plurality of modularized building blocks comprises:
constructing the scalable storage device by coupling each modularized building block in the first group of modularized building blocks and by coupling each modularized building block in the first group of modularized building blocks with one or more modularized building blocks in the second group of modularized building blocks.

13. The apparatus according to claim 10, further configured to:
select one input output processing unit in the cluster as a head of the cluster; and wherein the head of the cluster serves a metadata updating request; and each input output processing unit in the cluster capable of providing the metadata service and data service.

14. The apparatus according to claim 10, further configured to select another input output processing unit in the cluster as a new head of the cluster when the head of the cluster fails.

15. The apparatus according claim 10, further configured to:
on detecting commencing of operations by when one input output processing unit is started, notify other input output processing units of the at least one local magnetic disk attached to the one input output processing unit through the metadata service.

16. The apparatus according to claim 15, further configured to:
send the I/O request to the selected input output processing unit for processing the I/O request.

17. The apparatus according to claim 10, wherein a number of the hard disk drivers included in the list is defined by a terminal user.

18. A computer program product, the computer program product being embodied in a non-transitory computer-readable medium and includes a computer readable program instruction, and when being loaded into an apparatus, the computer-readable program instruction performs
constructing a scalable storage device by combining a plurality of modularized building blocks; wherein each modularized building block comprises a magnetic disk enclosure; and at least one modularized building block in the plurality of modularized building blocks comprises a storage processor, the storage processor comprising an input output processing unit; and wherein constructing the scalable storage device by combining a plurality of modularized building blocks comprises performing at least one of:
constructing the scalable storage device by coupling the first modularized building block to each of other modularized building blocks in the plurality of modularized building blocks; OR
constructing the scalable storage device by interconnecting each modularized building block in the plurality of modularized building blocks;
forming a cluster using the input output processing unit in the at least one modularized building block,
wherein forming a cluster using the input output processing unit in the at least one modularized building block further comprises:
selecting one input output processing unit in the cluster as a head of the cluster; wherein the head of the cluster serves the a metadata updating request; and each input output processing unit in the cluster capable of providing a metadata service and a data service, and selecting another input output processing unit in the cluster as a new head of the cluster when the head of the cluster fails; and
processing, using the cluster, at least one of an input or an output (I/O) request from a host and the metadata service, and wherein processing, using the cluster, at least one of an input or an output (I/O) request from a host and the metadata service comprises:
determining a storage location for data according to a consistent Hash algorithm, such that the data is evenly distributed across the plurality of modularized building blocks, the determining including:
computing a Hash value based on a volume identifier and an offset value the I/O request;
determining a list of multiple hard disk drivers corresponding to the Hash value;
querying the metadata service, to determine input output processing units directly attached to the hard disk drivers in the list, and obtain an input output load condition of each input output processing unit in the determined input output processing units; and
selecting, based on a result of the querying indicating each input output load condition, an input output processing unit for processing the I/O request from among the determined input output processing units directly attached to the hard disk drivers in the list, and wherein a number of the hard disk drivers included in the list is defined by a terminal user; and
sending the I/O request to the selected input output processing unit for processing the I/O request,
wherein the storage processor comprising the input output processing unit comprises a controller and at least two input output units, the controller realized within a Linux container running on the storage processor, each input output unit realized within a respective Linux container running on the storage processor.

19. The computer program product according to claim 18, wherein the plurality of modularized building blocks comprise a first group of modularized building blocks and a second group of modularized building blocks, and only the first group of modularized building blocks comprises the storage processor; and wherein when the computer-readable program instruction performs constructing the scalable storage device by combining a plurality of modularized building blocks computer-readable program instruction performs:
constructing the scalable storage device by coupling each modularized building block in the first group of modularized building blocks and by coupling each modularized building block in the first group of modularized building blocks with one or more modularized building blocks in the second group of modularized building blocks.

* * * * *